United States Patent
Anderson, Jr. et al.

(10) Patent No.: US 9,300,924 B2
(45) Date of Patent: *Mar. 29, 2016

(54) ELECTRONIC HANDHELD AUDIO/VIDEO RECEIVER AND LISTENING/VIEWING DEVICE

(75) Inventors: Tazwell L. Anderson, Jr., Atlanta, GA (US); Mark A. Wood, Boca Raton, FL (US); Geoffrey L. Anderson, Atlanta, GA (US)

(73) Assignee: Immersion Entertainment, LLC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,518

(22) Filed: Aug. 22, 2012

(65) Prior Publication Data
US 2013/0100293 A1   Apr. 25, 2013

Related U.S. Application Data

(63) Continuation of application No. 11/932,544, filed on Oct. 31, 2007, now abandoned, which is a continuation of application No. 09/837,128, filed on Apr. 18, 2001, now abandoned, which is a continuation-in-part of (Continued)

(51) Int. Cl.
*H04N 7/18* (2006.01)
*H04S 1/00* (2006.01)

(52) U.S. Cl.
CPC ............. *H04N 7/181* (2013.01); *H04S 1/002* (2013.01)

(58) Field of Classification Search
CPC ............ H04N 21/482; H04N 21/2187; H04N 5/4403; H04N 21/4126; H04N 21/43615; H04N 7/17318; H04N 21/43637; H04N 7/10; H04N 7/104

USPC .................. 725/63, 74, 82, 105, 135, 81; 348/157–159
See application file for complete search history.

(56) References Cited

U.S. PATENT DOCUMENTS

| | | | |
|---|---|---|---|
| 4,472,830 A | 9/1984 | Nagal | |
| 4,479,150 A | 10/1984 | Ilmer et al. | |

(Continued)

FOREIGN PATENT DOCUMENTS

| | | |
|---|---|---|
| EP | 1241860 | 4/1999 |
| GB | 2372892 | 9/2002 |

(Continued)

OTHER PUBLICATIONS

Office Action dated Sep. 7, 2007; U.S. Appl. No. 10/453,385; Filing Date Jul. 30, 2003; Applicant: Tamen L. Anderson, Jr.; 14 pages.

(Continued)

*Primary Examiner* — Ngoc Vu
(74) *Attorney, Agent, or Firm* — Dean D. Small; The Small Patent Law Group, LLC

(57) ABSTRACT

A handheld device in an audio and video system including a system for receiving and processing video and/or audio signals, a system for displaying a virtual image to a user, and a system for producing sounds audible to a user. The handheld device also incorporates a shroud to block ambient light when the handheld unit is engaged with the user's face. As a result, the user may hear sounds produced from the received audio signals. Further the user may see the virtual images produced from the received video signals when the handheld device is engaged with the users face.

25 Claims, 4 Drawing Sheets

Related U.S. Application Data application No. 09/322,411, filed on May 28, 1999, now Pat. No. 6,578,203, and a continuation-in-part of application No. 09/386,613, filed on Aug. 31, 1999, now Pat. No. 7,124,425.

(60) Provisional application No. 60/240,129, filed on Oct. 13, 2000.

(56) References Cited

U.S. PATENT DOCUMENTS

| | | |
|---|---|---|
| 4,486,897 A | 12/1984 | Nagal |
| 4,504,861 A | 3/1985 | Dougherty |
| 4,572,323 A | 2/1986 | Randall |
| 4,580,174 A | 4/1986 | Tokunaka |
| 4,605,950 A | 8/1986 | Goldberg et al. |
| 4,615,050 A | 10/1986 | Lonnstedt |
| 4,620,068 A | 10/1986 | Wieder |
| 4,665,438 A | 5/1987 | Miron |
| 4,727,585 A | 2/1988 | Flygstad |
| 4,764,817 A | 8/1988 | Blazek et al. |
| 4,802,243 A | 2/1989 | Griffiths |
| 4,809,079 A | 2/1989 | Blazek et al. |
| 4,855,827 A | 8/1989 | Best |
| 4,856,118 A | 8/1989 | Sapiejewski |
| 4,864,425 A | 9/1989 | Blazek et al. |
| 4,866,515 A | 9/1989 | Tagawa et al. |
| 4,887,152 A | 12/1989 | Matsuzaki et al. |
| 4,965,825 A | 10/1990 | Harvey et al. |
| 4,982,278 A | 1/1991 | Dahl et al. |
| 5,023,707 A | 6/1991 | Briggs |
| 5,023,955 A | 6/1991 | Murphy, II et al. |
| 5,109,414 A | 4/1992 | Harvey et al. |
| 5,119,442 A | 6/1992 | Brown |
| 5,128,765 A | 7/1992 | Dingwall et al. |
| 5,138,440 A | 8/1992 | Radice |
| 5,138,722 A | 8/1992 | Urella et al. |
| 5,173,721 A | 12/1992 | Green |
| 5,179,736 A | 1/1993 | Scanlon |
| 5,189,630 A | 2/1993 | Barstow et al. |
| 5,237,648 A | 8/1993 | Mills et al. |
| 5,243,415 A | 9/1993 | Vance |
| 5,252,069 A | 10/1993 | Lamb et al. |
| 5,289,272 A | 2/1994 | Rabowsky et al. |
| 5,289,288 A | 2/1994 | Silverman et al. |
| 5,297,037 A | 3/1994 | Ifuku |
| 5,321,416 A | 6/1994 | Bassett et al. |
| 5,359,463 A | 10/1994 | Shirochi et al. |
| 5,392,158 A | 2/1995 | Tosaki |
| 5,408,686 A | 4/1995 | Mankovitz |
| 5,414,544 A | 5/1995 | Aoyagi et al. |
| 5,440,197 A | 8/1995 | Gleckman |
| 5,448,291 A | 9/1995 | Wickline |
| 5,463,428 A | 10/1995 | Lipton et al. |
| 5,481,478 A | 1/1996 | Palmieri et al. |
| 5,485,504 A | 1/1996 | Ohnsorge |
| 5,506,705 A | 4/1996 | Yamamoto et al. |
| 5,510,828 A | 4/1996 | Lutterbach |
| 5,513,384 A | 4/1996 | Brennan et al. |
| 5,524,195 A | 6/1996 | Clanton et al. |
| 5,546,099 A | 8/1996 | Quint et al. |
| 5,583,562 A | 12/1996 | Birch et al. |
| 5,585,850 A | 12/1996 | Schwaller |
| 5,585,858 A | 12/1996 | Harper et al. |
| 5,594,551 A | 1/1997 | Monta |
| 5,598,208 A | 1/1997 | McClintock |
| 5,600,365 A | 2/1997 | Kondo et al. |
| 5,600,368 A | 2/1997 | Matthews, III |
| 5,613,191 A | 3/1997 | Hylton et al. |
| 5,617,331 A | 4/1997 | Wakai et al. |
| 5,627,915 A | 5/1997 | Rosser et al. |
| 5,631,693 A | 5/1997 | Wunderlich et al. |
| 5,642,221 A | 6/1997 | Fischer et al. |
| 5,663,717 A | 9/1997 | DeLuca |
| 5,668,339 A | 9/1997 | Shin |
| 5,671,320 A | 9/1997 | Cookson et al. |
| 5,682,172 A | 10/1997 | Travers et al. |
| 5,696,521 A | 12/1997 | Robinson et al. |
| 5,708,961 A | 1/1998 | Hylton et al. |
| 5,712,950 A | 1/1998 | Cookson et al. |
| 5,719,588 A | 2/1998 | Johnson |
| 5,724,091 A | 3/1998 | Freeman et al. |
| 5,729,471 A | 3/1998 | Jain et al. |
| 5,729,549 A | 3/1998 | Kostreski et al. |
| 5,742,263 A | 4/1998 | Wang et al. |
| 5,742,521 A | 4/1998 | Ellenby et al. |
| 5,754,254 A | 5/1998 | Kobayashi et al. |
| 5,760,819 A | 6/1998 | Sklar et al. |
| 5,760,824 A | 6/1998 | Hicks, III |
| 5,767,820 A | 6/1998 | Bassett et al. |
| 5,793,416 A | 8/1998 | Rostoker et al. |
| 5,806,005 A | 9/1998 | Hull et al. |
| 5,808,695 A | 9/1998 | Rosser et al. |
| 5,812,224 A | 9/1998 | Maeda et al. |
| 5,815,126 A | 9/1998 | Fan et al. |
| 5,841,122 A | 11/1998 | Kirchhoff |
| 5,844,656 A | 12/1998 | Ronzani et al. |
| 5,847,612 A | 12/1998 | Birleson |
| 5,847,762 A | 12/1998 | Canfield et al. |
| 5,867,223 A | 2/1999 | Schindler et al. |
| 5,867,579 A | 2/1999 | Saito |
| 5,880,773 A | 3/1999 | Suzuki |
| 5,892,554 A | 4/1999 | DiCicco et al. |
| 5,894,320 A | 4/1999 | Vancelette |
| 5,900,849 A | 5/1999 | Gallery |
| 5,903,395 A | 5/1999 | Rallison et al. |
| 5,920,827 A | 7/1999 | Baer et al. |
| 5,946,635 A | 8/1999 | Dominguez |
| D413,881 S | 9/1999 | Ida et al. |
| 5,953,076 A | 9/1999 | Astle et al. |
| 5,982,445 A | 11/1999 | Eyer et al. |
| 5,986,803 A | 11/1999 | Kelly |
| 5,990,958 A | 11/1999 | Bheda et al. |
| 5,999,808 A | 12/1999 | LaDue |
| 6,002,720 A | 12/1999 | Yurt et al. |
| 6,002,995 A | 12/1999 | Suzuki et al. |
| 6,009,336 A | 12/1999 | Harris et al. |
| 6,016,348 A | 1/2000 | Blatter et al. |
| 6,020,851 A | 2/2000 | Busack |
| 6,034,716 A | 3/2000 | Whiting et al. |
| 6,035,349 A | 3/2000 | Ha et al. |
| 6,043,837 A | 3/2000 | Driscoll, Jr. et al. |
| 6,052,239 A | 4/2000 | Matsui et al. |
| 6,060,995 A | 5/2000 | Wicks et al. |
| 6,064,860 A | 5/2000 | Ogden |
| 6,069,668 A | 5/2000 | Woodham, Jr. et al. |
| D426,527 S | 6/2000 | Sakaguchi |
| 6,078,954 A | 6/2000 | Lakey et al. |
| 6,080,063 A | 6/2000 | Khosla |
| 6,084,584 A | 7/2000 | Nahi et al. |
| 6,088,045 A | 7/2000 | Lumelsky et al. |
| 6,095,423 A | 8/2000 | Houdeau et al. |
| 6,097,441 A | 8/2000 | Allport |
| 6,100,925 A | 8/2000 | Rosser et al. |
| 6,104,414 A | 8/2000 | Odryna et al. |
| 6,112,074 A | 8/2000 | Pinder |
| 6,121,966 A | 9/2000 | Teodosio et al. |
| 6,124,862 A | 9/2000 | Boyken et al. |
| 6,125,259 A | 9/2000 | Perlman |
| 6,128,143 A | 10/2000 | Nalwa |
| 6,131,025 A | 10/2000 | Riley et al. |
| 6,133,946 A | 10/2000 | Cavallaro et al. |
| 6,137,525 A | 10/2000 | Lee et al. |
| 6,144,375 A | 11/2000 | Jain et al. |
| 6,166,734 A | 12/2000 | Nahi et al. |
| 6,192,257 B1 | 2/2001 | Ray |
| 6,195,090 B1 | 2/2001 | Riggins, III |
| 6,209,028 B1 | 3/2001 | Walker et al. |
| 6,215,475 B1 | 4/2001 | Meyerson et al. |
| 6,327,570 B1 | 12/2001 | Stevens |
| 6,330,021 B1 | 12/2001 | Devaux |
| 6,347,301 B1 | 2/2002 | Bearden, III et al. |
| 6,351,252 B1 | 2/2002 | Atsumi et al. |
| 6,356,905 B1 | 3/2002 | Gershman et al. |

(56) References Cited

U.S. PATENT DOCUMENTS

| | | |
|---|---|---|
| 6,380,978 B1 | 4/2002 | Adams et al. |
| 6,401,085 B1 | 6/2002 | Gershman et al. |
| 6,417,853 B1 | 7/2002 | Squires et al. |
| 6,421,031 B1 | 7/2002 | Ronzani et al. |
| 6,424,369 B1 | 7/2002 | Adair et al. |
| 6,434,403 B1 | 8/2002 | Ausems et al. |
| 6,434,530 B1 | 8/2002 | Sloane et al. |
| 6,463,299 B1 | 10/2002 | Macor |
| 6,466,202 B1 | 10/2002 | Suso et al. |
| 6,505,055 B1 | 1/2003 | Kahn et al. |
| 6,522,352 B1 | 2/2003 | Strandwitz et al. |
| 6,525,762 B1 | 2/2003 | Mileski et al. |
| 6,532,152 B1 | 3/2003 | White et al. |
| 6,535,254 B1 | 3/2003 | Olsson et al. |
| 6,535,493 B1 | 3/2003 | Lee et al. |
| 6,549,229 B1 | 4/2003 | Kirby et al. |
| 6,564,070 B1 | 5/2003 | Nagamine et al. |
| 6,567,079 B1 | 5/2003 | Smailagic et al. |
| 6,570,889 B1 | 5/2003 | Stirling-Gallacher et al. |
| 6,574,672 B1 | 6/2003 | Mitchell et al. |
| 6,578,203 B1 | 6/2003 | Anderson, Jr. et al. |
| 6,597,346 B1 | 7/2003 | Havey et al. |
| 6,624,846 B1 | 9/2003 | Lassiter |
| 6,669,346 B2 | 12/2003 | Metcalf |
| 6,681,398 B1 | 1/2004 | Verna |
| 6,781,635 B1 | 8/2004 | Takeda |
| 6,782,238 B2 | 8/2004 | Burg et al. |
| 6,785,814 B1 | 8/2004 | Usami et al. |
| 6,931,290 B2 | 8/2005 | Forest |
| 6,934,510 B2 | 8/2005 | Katayama |
| 6,961,430 B1 | 11/2005 | Gaske et al. |
| 7,006,164 B1 | 2/2006 | Morris |
| 7,149,549 B1 | 12/2006 | Ortiz |
| 7,210,160 B2 | 4/2007 | Anderson, Jr. et al. |
| 7,227,952 B2 | 6/2007 | Qawami et al. |
| 7,268,810 B2 | 9/2007 | Yoshida |
| 7,448,063 B2 | 11/2008 | Freeman et al. |
| 8,239,910 B2 * | 8/2012 | Anderson et al. ............. 725/118 |
| 2001/0016486 A1 | 8/2001 | Ko |
| 2001/0030612 A1 | 10/2001 | Kerber et al. |
| 2001/0034734 A1 | 10/2001 | Whitley et al. |
| 2001/0039180 A1 | 11/2001 | Sibley et al. |
| 2001/0039663 A1 | 11/2001 | Sibley |
| 2001/0042105 A1 | 11/2001 | Koehler et al. |
| 2001/0047516 A1 | 11/2001 | Swain et al. |
| 2002/0007490 A1 | 1/2002 | Jeffery |
| 2002/0046405 A1 | 4/2002 | Lahr |
| 2002/0052965 A1 | 5/2002 | Dowling |
| 2002/0057365 A1 | 5/2002 | Brown |
| 2002/0063799 A1 | 5/2002 | Ortiz et al. |
| 2002/0069416 A1 | 6/2002 | Stiles |
| 2002/0069419 A1 | 6/2002 | Raverdy et al. |
| 2002/0090217 A1 | 7/2002 | Limor et al. |
| 2002/0091723 A1 | 7/2002 | Traner et al. |
| 2002/0095682 A1 | 7/2002 | Ledbetter |
| 2002/0104092 A1 | 8/2002 | Arai et al. |
| 2002/0108125 A1 | 8/2002 | Joao |
| 2002/0115454 A1 | 8/2002 | Hardacker |
| 2002/0130967 A1 | 9/2002 | Sweetser |
| 2002/0138582 A1 | 9/2002 | Chandra et al. |
| 2002/0138587 A1 | 9/2002 | Koehler |
| 2002/0152476 A1 | 10/2002 | Anderson et al. |
| 2003/0004793 A1 | 1/2003 | Feuer et al. |
| 2003/0005052 A1 | 1/2003 | Feuer et al. |
| 2003/0005437 A1 | 1/2003 | Feuer et al. |
| 2003/0014275 A1 | 1/2003 | Bearden, III et al. |
| 2003/0023974 A1 | 1/2003 | Dagtas et al. |
| 2003/0204630 A1 | 10/2003 | Ng |
| 2004/0034617 A1 | 2/2004 | Kaku |
| 2004/0073437 A1 | 4/2004 | Halgas et al. |
| 2004/0207719 A1 | 10/2004 | Tervo et al. |
| 2004/0243922 A1 | 12/2004 | Sirota et al. |
| 2005/0076387 A1 | 4/2005 | Feldmeier |
| 2006/0174297 A1 | 8/2006 | Anderson et al. |
| 2007/0107028 A1 | 5/2007 | Monroe |

FOREIGN PATENT DOCUMENTS

| | | |
|---|---|---|
| JP | 10136277 | 5/1998 |
| JP | 20010275101 | 10/2001 |
| WO | WO 9411855 | 5/1994 |
| WO | WO 9966670 | 12/1999 |
| WO | WO 0054554 | 9/2000 |
| WO | 03001772 | 1/2003 |
| WO | WO-2004/002130 A2 | 12/2003 |

OTHER PUBLICATIONS

Office Action dated Aug. 10, 2007; U.S. Appl. No. 10/630,069; Filing Date Jul. 30, 2003; Applicant: Tazwell L. Anderson, Jr.;11 pages.

Office Action dated Sep. 10, 2007; U.S. Appl. No. 10/680,612; Filing Date Oct. 7, 2003; Applicant: Tazwell L. Anderson, Jr.;19 pages.

Office Action dated Aug. 23, 2007; U.S. Appl. No. 09/837,128; Filing Date Apr. 18, 2001; Applicant: Tazwell L. Anderson, Jr.;13 pages.

Spanberg, Erik; "Techies Hit the Fast Track"; The Business Journal. charlotte: Jul 30, 1999; vol. 14, Iss. 17; pp. 3.

Hiestand, Michael; Up Next: Rent Wireless Video Devices at games: [FINAL Edition]; USA Today; McLean, VA: Jan 29, 2002; pp. 2.

PR Newswire; "Baseball Fans to Get Best of Both Worlds: Seats in the Stadium and Up Close Camera Shots"; New York; Mar. 22, 2002; 2 pgs.

Ron Glover; "Armchair Baseball From the Web—or Your Stadium Seat", copyright 1998, The McGraw-Hill Companies, Inc.; 2 pgs.

CHOICESEAT™ Fact Sheet; Jun. 13, 2007; 4 pgs.

ChoiceSeat—Events Operations Manual for Madison Square Garden; Dec. 15, 1999, Intel Corporation; 91 pgs.

ChoiceSeat™; www.choiceseat.net; 1999 Williams Communications; 71 pgs.

ChoiceSeat—System Administrator's Binder for Madison Square Garden; Dec. 17, 1999; 80 pgs.

ChoiceSeat—In Your Face Interactive Experience—1998 Superbowl; Broncos v. Packers; 15 pgs.

In-Seat Interactive Advertising Device Debuts, Nov. 19, 1999, Williams; 2 pgs.

Reality Check Studios Goes Broadband with Production for Choiceseat at Madison Square Garden; Dec. 1, 1999; 3 pgs.

Press Release: Vela Research LP to Supply Encoding for ChoiceSeat at SuperBowl XXXII; Jan. 13, 1998; 2 pgs.

Ruel's Report: ChoiceSeat; ChoiceSeat makes Worldwide Debut at the 1998 Super Bowl in San Diego California; Sep. 1, 1997; 9 pgs.

San Diego Metropolitan; Jan. 1998; 29 pgs.

Stadium fans touch the future—Internet Explorer and touch screens add interactivity to Super Bowl XXXII; Jan. 26, 1998; 2 pgs.

Telephony online Intelligence for the Broadband Economy; Fans take to ChoiceSeats Interactive technology, e-commerce expand to sporting events; Jan. 10, 2000; 2 pgs.

Williams ChoiceSeat interactive network launched inaugural season with Tampa Bay Devil Rays; expands features for second season; Mar. 30, 1998; 2 pgs.

Williams Communications; ChoiceSeat™ demonstrates the interactive evolution of sports at Super Bowl™ XXXIII; Jan. 20, 1999; 2 pgs.

ChoiceSeat The Premiere Provider of Interactive Event Entertainment; 18 pgs.

Choice Seat Specification, Version 2.2; Ethernet Model; Williams Communications Group; Oct. 10, 1997; 13 pgs.

ChoiceSeat Intellectual Property List; 3 pgs.

CSI Incorporated Draft; Schedule A-IP; Schedule of Patents; 2 pgs.

HK-388P/PW Color Camera Operation Manual; vol. 2; Ikegami; 280 pgs.

Eric Breier; Computer age comes to ballpark; Quallcomm is test site for ChoiceSeat's sports television network; Aug. 1997; 2 pgs.

Robert Carter; Web Technology Its in THE Game; SiteBuilder network; Dec. 15, 1997; 1 pg.

ChoiceSeat™ Fact Sheet Project Super Bowl XXXII; Qualcomm Stadium, San Diego, Calif., USA; Jan. 25, 1998, 1 pg.

Screen Shot Super Bowl XXXII; Jan. 25, 1998; 1 pg.

Vyvx® ChoiceSeat Cover, 1 pg.

(56) References Cited

OTHER PUBLICATIONS

Welcome to the Interactive Evolution of Sports. ChoiceSeat™; Jan. 1998; 1 pg.
The Ultimate Super Bowl Experiene! Williams ChoiceSeat™ Jan. 1998; 1 pg.
Bradley J. Fikes; Super Bowl XXXII; It's just business; For lucky 600 fans, there'll be TV sets at the seats; San Diego North County Times; Jan. 1998; 1 pg.
D.R. Stewart; Williams Interactive Video Games Football Fans Choice; Tulsa World; Jan. 1998; tulsaworld.com; 2 pgs.
ChoiceSeat Handout; Welcome to the Interactive Evolution of Sports. www.choiceseat.net; 1 pg.
Cyberscope; Just Call It Wired Bowl; Jan. 28, 1994; 1 pg.
Ruel.Net Set-Top Page Interactive TV Top Box News; Ruel's Report; ChoiceSeat; Fall 1998; 7 pgs.
Williams ChoiceSeat Interactive network launches inaugural session with Tampa Bay Devil Rays; expands features for second season with San Diego Padres; www.williams.com/newsroom/news_releases; Mar. 30, 1998; 2 pgs.
The Herald: Super Bowl Turns Techno Bowl; Jan. 24, 1999; 1 pg.
Williams Communications ChoiceSeat™ demonstrates the interactive evolution of sports at Super Bowl™ XXXIII: http://www.williams.com/newsroom/news_releases; Jan. 20, 1999; 3 pgs.
NTN interactive games available on ChoiceSeat™ during Super Bowl XXXIII; Jan. 1999; 1 pg.
Williams Fact Sheet; Super Bowl™ XXXIII; Pro Player Stadium, Miami, Florida, USA; Jan. 31, 1999; 1 pg.
Super Bowl XXXIII Game Recap; http://www.nfl.com/superbowl/history/recap/sbxxxiii; 8 pgs.
ChoiceSeat™ User Guide; New York Knicks; The Garden Fanlink; 8 pgs.
ChoiceSeat™ User Guide; New York Rangers; The Garden Fanlink; 8 pgs.
ChoiceSeat™Flow Chart; New York Knicks; The Garden Fanlink; 1 pg.
ChoiceSeat™ Presentation Document; The "Be There" Experience; 15 pgs.
In-Seat Interactive Advertising Device Debuts; http://www.williams.com/newsroom/news_releases; Nov. 19, 1999; 2 pgs.
Intel and ChoIceSeat™ collaborate to advance interactive sports technology; http://www.williams.com/newsroom/news_releases; Nov. 29, 1999; 3 pgs.
Medla Coverage; ChoiceSeat The Interactive Evolution of Sports; Good News Travels Fast; 1 pg.
Screen Shot ChoiceSeat The Interactive Evolution of Sports; 1 pg.

Digital Video; ChoiceSeat Coverage; www.dv.com; Apr. 2000; 11 pgs.
Wall Street Journal; With Wired Seats, Fans Get Replays, Rules, Snacks; May 21, 2000; 1 pg.
Wireless History; www.jhsph.edu/wireless/story; 5 pgs.
Wikipedia; Wireless LAN; 4 pgs.
Proposed ChoiceSeat Client Specification Summary; Initial Draft Aug. 29, 1997; Updated Sep. 30, 1997; 2 pgs.
Proposed ChoiceSeat Network Specification Summary; Initial Draft Aug. 25, 1997, 2 pgs.
Proposed ChoiceSeat Network Specification Summary; Updated Draft Sep. 30, 1997; 4 pgs.
Quallcomm Stadium ChoiceSeat Network Diagram; May 11, 1998; 5 pgs.
Schedule of Personal Property Patents; Software and Trademarks etc Draft; 3 pgs.
SGI and the Pepsi Center, 2 pgs.
Adamson, W.A.; Antonelli, C.J.; Coffman, K.W.; McDaniel, P.; Rees, J.; Secure Distributed Virtual Conferencing Multicast or Bust; CITI Technical Report 99-1; Jan. 25, 1999; 8 pgs.
Wireless Dimensions Corporation Adds to Mobile-Venue Suite™; Press Release, Wireless Dimensions; Allen, Texas; Jul. 26, 2000; www:wirelessdimensions.net/news.html, 2 pgs.
Battista, Stafano, Casalino, Franco and Lande, Claudio; "MPEG-4: A Multimedia Standard for the Third Millennium, Part 1"; IEEE 1999, 10 pgs.
Dapeng, Wu, Hou-Yiwei Thomas; Zhu, Wenwu; Lee Hung-Ju; Chiang, Tihao; Zhang; Ya-Qin and Chao, H. Jonathan; "*On End-to-End Architecture for Transporting MPEG-4 Video Over the Internet*" IEEE Transaction, vol. 10, No. 6, Sep. 2000, 19 pgs.
Capin, Tolga K., Petajen, Eric and Ostermann, Joern; "Efficient Modeling of Virtual Humans in MPEG-4" IEEE 2000, 4 pgs.
Seeing is Believing—Motorola and PacketVideoDemonstrate MPEG4 Video Over GPRS; Publication: Business Wire Date; Wednesday, May 10, 2000; www.allbusiness.com; 4 pgs.
SGI and the Pepsi Center; 2 pgs.
Sony GV S50 Video Walkman Operating Instructions; 1992; 3 pgs.
PCT International Search Report dated Feb. 5, 2004; In re International Application No. PCT/US03/31696.
Written Opinion cited document in International Application No. PCT/US03/31696.
Canadian Office Action for Application No. 2,598,644; dated Sep. 24, 2014. (4 pages).

* cited by examiner

ELECTRONIC HANDHELD AUDIO/VIDEO RECEIVER AND LISTENING/VIEWING DEVICE

CROSS REFERENCE TO RELATED APPLICATION

This document is a continuation of U.S. patent application Ser. No. 11/932,544, filed Oct. 31, 2007 which is a continuation of U.S. patent application entitled "Electronic Handheld Audio/Video Receiver and Listening/Viewing Device" assigned Ser. No. 09/837,128, filed Apr. 18, 2001, now Abandoned, which is a continuation-in-part and claims priority to: (1) non-provisional U.S. patent application entitled "Video/Audio System and Method Enabling a User to Select Different Views and Sounds Associated With an Event," assigned Ser. No. 09/322,411, and filed May 28, 1999, now U.S. Pat. No. 6,578,203; (2) non-provisional U.S. patent application entitled "Audio/Video System and Method Utilizing a Head Mounted Apparatus With Noise Attenuation," assigned Ser. No. 09/386,613, and filed Aug. 31, 1999, now U.S. Pat. No. 7,124,425 which also claims priority to and the benefit of the filing date of the provisional application "Electronic Handheld Video Receiver and Viewing Device," assigned Ser. No. 60/240,129, and filed Oct. 13, 2000, the complete subject matter all of which are hereby expressly incorporated by reference in their entirety.

BACKGROUND OF THE INVENTION

1. Field of the Invention

The present invention generally relates to an apparatus for processing video and/or audio signals and for displaying images and producing sounds based on the processed video and/or audio signals.

2. Related Art

Audio and video signals are generated from a plurality of sources during many events. An "event" is any occurrence viewed by a spectator. For example, at a football game or other type of sporting event, television crews usually position cameras and microphones at various locations in the stadium. As used herein, "stadium" shall be defined to mean any non-movable structure having a large number (i.e., thousands) of seats, wherein an event occurs at (i.e., within a close proximity of) the seats such that spectators sitting in the seats can view and hear the event. These crews generate audio and video signals defining views and sounds of the football game from various perspectives.

One of the video signals and one of the audio signals are usually selected at a television station to form a combined audio/video signal. This signal is then modulated and transmitted so that users having a television can receive the signal via the television. The television demodulates the combined signal and displays an image defined by the video signal on a display screen and reproduces the sounds defined by the audio signal via speakers. Therefore, the sights and sounds of the game can be viewed and heard via the television.

However, spectators viewing and/or hearing the sights and sounds of the game via televisions are not usually given the opportunity to select which video and/or audio signals are modulated and transmitted to the television. Therefore, the spectator is only able to receive the signals modulated and transmitted to the television, even though the spectator may prefer to receive the other signals that are generated at the game.

Spectators who actually attend the sporting event are usually given more options to view and/or hear the sights and sounds of the sporting event from different perspectives. In this regard, one or more monitors are sometimes located at one or more locations in the stadium. Each monitor within the stadium receives one of the aforementioned video signals and displays an image defined by the received video signal to many of the spectators. However, the monitor does not always display a desirable perspective with respect to each spectator in the stadium, and the monitor is often not located in a convenient location for many of the spectators. In this regard, many of the spectators often must leave their seats (or other locations) in the stadium and go to a location where the spectators, along with other spectators, can view the monitor displaying the desired perspective. The spectators viewing the monitor often do not have control over which image is displayed by the monitor.

Thus a heretofore unaddressed need exists in the industry for providing a system and method that enables a spectator to conveniently view an event from different perspectives.

SUMMARY OF THE INVENTION

The present invention overcomes the inadequacies and deficiencies of the prior art as discussed hereinbefore. Generally, the present invention provides a system and method for providing a user with a plurality of audio and video signals defining different sounds and views associated with an event.

The present invention includes a handheld device having a video receiver, a virtual image display device, and one or more speakers. The virtual image display device produces virtual visual images based on received video signals, and the speakers produce sounds based on the received audio signals. As a result, the user may hear the sounds produced by the speakers and may see the video images produced by the display device by holding the handheld device to the user's face, or the user may watch the event live by removing the handheld device from the user's face.

In accordance with, another feature of the present invention, the handheld device incorporates an integrated light shield/shroud to block ambient light that can interfere with the user's ability to view the virtual image. Unlike individual eye shrouds characteristic of a pair of optical binoculars, the present shroud shields both eyes at the same time. Among other advantages, the present shroud enables the user to operate the device while wearing eyeglasses or sunglasses.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

A preferred embodiment of the present invention will be described hereafter in the context of football game applications. However, the scope of the present invention should not be so limited, and it should be apparent to one skilled in the art that the principles of the present invention may be employed in the context of other applications, particularly in the context of other sporting events (e.g., auto races, basketball games, baseball games, hockey matches, etc.).

Figure 1:
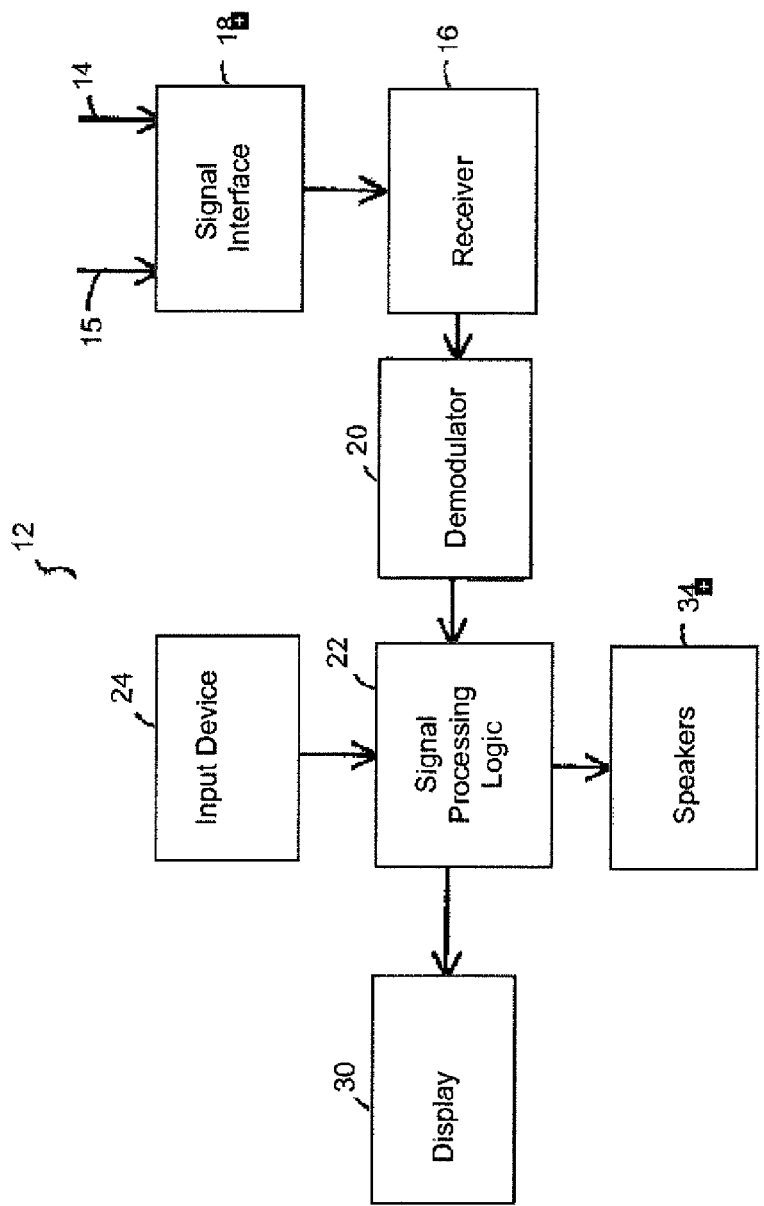
FIG. 1 is a block diagram illustrating a video/audio receiving system in accordance with the present invention.

FIG. 1 depicts a video/audio receiving system 12 implementing the principles of the present invention. At least one video signal 14 and at least one audio signal 15 are received by a receiver 16. Each of the video signals 14 defines a view of the event from a different perspective. For example, the video signals 14 may be generated by different video cameras located at different locations around the stadium. Furthermore, each of the audio signals 15 defines different sounds associated with the game. For example, at least one of the audio signals 15 may be generated from a microphone located close to the sideline of the game or in one of the helmets of one of the players of the game such that the audio signal defines sounds from the participants in the game. Alternatively, at least one of the audio signals 15 may define the comments of television commentators, and at least one of the audio signals 15 may define the comments of radio commentators.

In particular, at least one of the audio and one of the video signals may be transmitted as a single combined signal from an audio/video system described in U.S. patent application Ser. No. 09/322,411 entitled "Video/Audio System and Method Enabling a User to Select Different Views and Sounds Associated With an Event," Additionally, one or more of the video and/or audio signals may be wireless, in which case, the interface 18 may comprise an antenna for receiving the wireless signals. However, various other types of signal interfaces 18 are possible. For example, the signal interface 18 may be a cable or other type of signal transmission apparatus. Any type of wireless and/or non-wireless technique may be used to transmit signals to the video and audio receiver 16 via the signal interface 18.

Some of the audio and video signals 15 and 14 can be unmodulated when transmitted to the receiver 16 through the signal interface 18 and, therefore, do not need to be demodulated by the system 11. However, some of the audio signals 15 and/or video signals 14 may be modulated when received by the receiver 16 and, therefore, may need to be demodulated by the system 12. For example, at least one of the audio signals 15 defining the comments of the radio commentators may be modulated as a radio signal for transmission to radios located at or away from the stadium, and at least one of the video signals 14 may be modulated as a television signal for transmission to televisions located at or away from the stadium. Therefore, as shown by FIG. 1, the system 12 preferably includes a demodulator 20 configured to demodulate any modulated audio signals 15 and/or video signals 14 received by the receiver 16 through the signal interface 18.

Once demodulated, if necessary, the audio and video signals 15 and 14 are processed by signal processing logic 22, which selects and conditions the signals 15 and 14. More specifically, the signal processing logic 22 selects, based on inputs from the user, one of the audio signals 15 and one of the video signals 14. Note that the logic 22 may be implemented via hardware, software, or a combination thereof. Further, the logic 22 may include one or more filters for filtering out the unselected signals 15 and 14. After selecting one of the audio and video signals 15 and 14, the logic 22 conditions the selected video signals 15 so that they are compatible with the virtual image display system 30, and the logic 22 conditions the selected audio signals 15 so that they are compatible with the speakers 34. The logic 22 then transmits the conditioned audio signals 15 to the speakers 34, which converts the conditioned audio signals 15 into sound. The logic 22 also transmits the conditioned video signals 14 to the virtual image display system 30, which displays the image defined by the conditioned video signals 14 according to techniques known in the art. Note that the processing performed by the signal processing logic 22 may be similar to or identical to the processing performed by the system in U.S. patent application Ser. No. 09/322,411 entitled "Video/Audio System and Method Enabling a User to Select Different Views and Sounds Associated With an Event."

An input device 24, which may comprise one or more buttons knobs, dials, or other types of switches, may be used to provide the inputs for the processing performed by the processing logic 22. By controlling the components of the input device 24, the user may control various aspects of the processing performed by the logic 22, including which video signals 14 are selected for viewing, as well as which audio signals 15 are heard and the volume of the audio signals 15.

Figure 2:
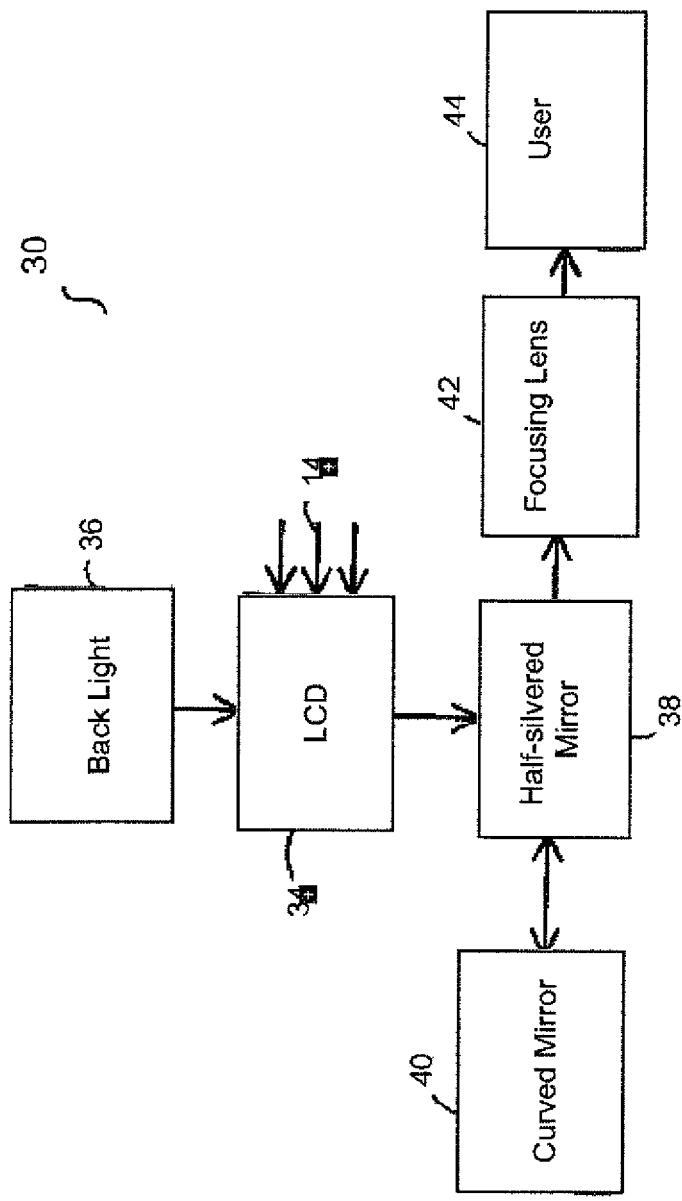
FIG. 2 is a block diagram illustrating more detailed view of a virtual image display system depicted in FIG. 1.

FIG. 2 depicts an exemplary virtual image display system 30 that may be employed to implement the principles of the present invention. A processed video signal 14 is displayed onto a Liquid Crystal Display 34. The Liquid Crystal Display 34 may be lit from the back via a back light 36, with the light shining through the Liquid Crystal Display 34, creating an image on the other side of the Liquid Crystal Display 34. On the opposite side of the Liquid Crystal Display 34 from the back light 36, some distance from the Liquid Crystal. Display 34, is a half-silvered mirror 38. The halt-silvered mirror 38 is set at an approximately forty-five degree angle from the Liquid Crystal Display 34. The image reflects off the half-silvered mirror 38 onto a separate curved mirror 40 set some distance away from the half-silvered mirror 38. The curved mirror 40 magnifies the virtual image. The magnified virtual image reflects off of the curved mirror 40, back to the half-silvered mirror 3S. The magnified virtual image passes through the half-silvered mirror 38 to a lens 42 located on the opposite side of the half-silvered mirror 38 from the curved mirror 40. The magnified virtual image passes through the has 42, which focuses the magnified virtual image. When the handheld device 50 is held to the user's face and the user 44 looks into the lens 42, the magnified virtual image is observed by the user 44. The user 44 observes the magnified virtual image as much greater in size than the actual size of the image on the Liquid Crystal Display 34, with said magnified virtual image appearing to the user 44 to be located several feet in front of the user 44. It should be noted that other embodiments of the virtual image display system 30 may be employed without departing from the principles of the present invention. For example, in some embodiments, a single prism can be used to replace components 38, 110, and 112.

In the preferred embodiment, the receiver 16, signal processing logic 22, virtual display system 30, and speakers 34 are all embodied within a handheld device 50, which is discussed in further detail herein below. Note that the handheld device 50 may be comprised of a housing unit or a casing coupled to each of the components shown in FIG. 1. One or more of the components may be housed within the casing. By utilizing a handheld device 50 for viewing video signals 14, the user's experience may be enhanced. For example, when a handheld device 50 is used to show a field view of the game from a camera located on another side of the stadium, the user 44 sees a similar view as spectators located in that portion of the stadium. Because the handheld device 50 limits the user's peripheral view of the environment around Him the user 44 naturally focuses on the view provided by the handheld device 50. When the user 44 desires to view the game directly, the user may quickly lower the device 50 so that the user's view of the game is not obstructed by the device 50. The handheld device 50 may similarly enhance a user's experience at other events, such as other sporting events, for example.

Furthermore, since the device 50 is handheld, the device 50 is easily portable, and the user 44 may carry the handheld device 50 with him and choose where he would like to view the images produced by the handheld device 50. Indeed, the user 44 may roam the stadium with the device 50 in hand while intermittently viewing the images and hearing the sounds produced by the system 12. Furthermore, by manipulating buttons or other types of switches 56 in the user input 24, the user 44 may control which video signals 14 are displayed and which audio signals 15 are produced by the system 12. Accordingly, the handheld device 50 gives the user 44 more flexibility in how the user 44 observes and listens to the sporting event and, as a result, makes the event a more enjoyable experience.

Figure 3:
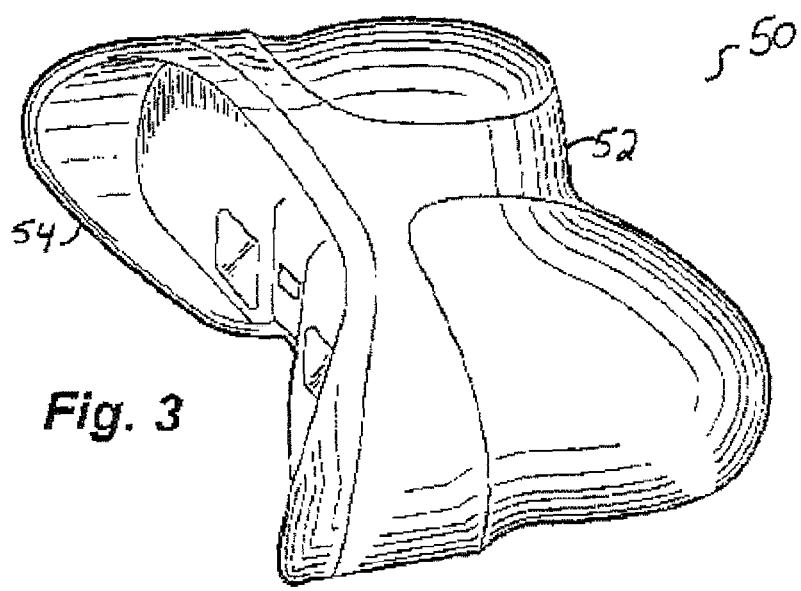
FIG. 3 is a three dimensional side view of an exemplary handheld device for implementing the video/audio receiving system of FIG. 1.
Figure 5:
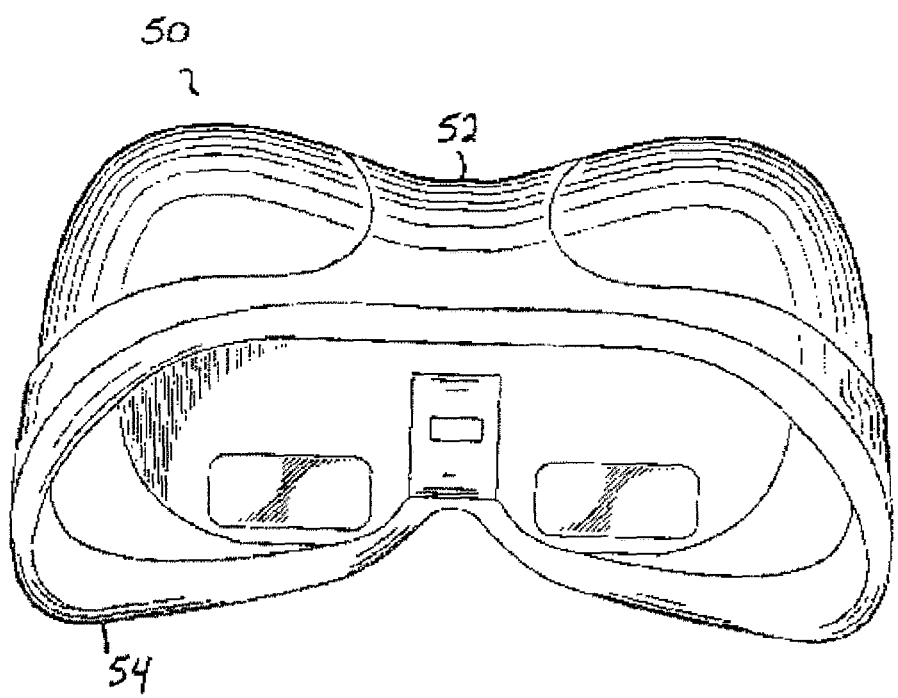
FIG. 5 is a three dimensional front view of the exemplary handheld device depicted in FIG. 3.
Figure 4:
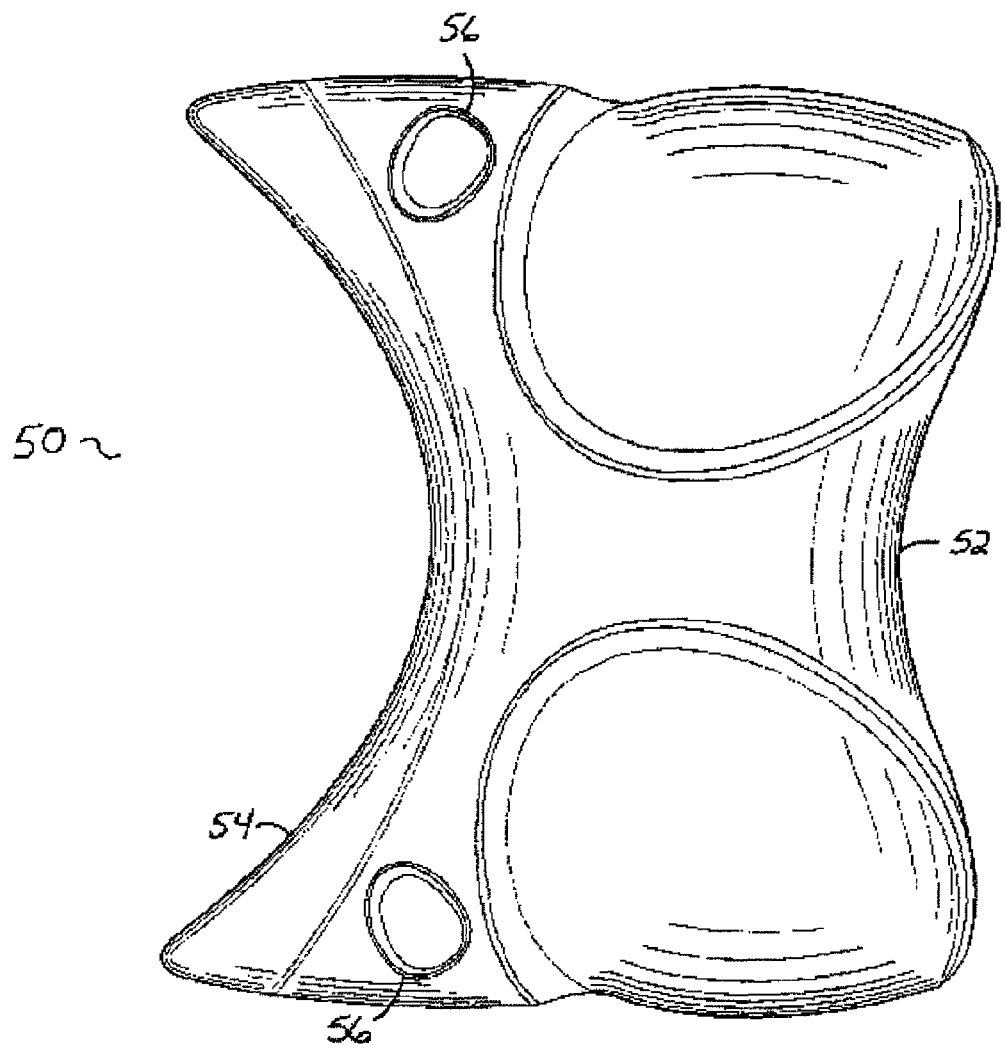
FIG. 4 is a top view of the exemplary handheld device depicted in FIG. 3.

Many different types of casings for the handheld device 50 may be employed to implement the present invention. FIGS. 3, 4 and 5 depict an exemplary handheld device 50.

As depicted in FIG. 3, the handheld device 50 includes a main component 52, containing the system 12 (FIG. 1) used to provide a virtual image to the user 44, as discussed hereinbefore. The handheld device 50 also includes a shroud 54 to block out ambient light. The shroud 54 is adapted to receive the user's forehead and allows the handheld device 50 to be engaged with the user's forehead while the user 44 is wearing eyeglasses or sunglasses. As can be seen in FIG. 5, the shroud 54 is shaped and sized to completely cover the user's eyes, allowing the handheld device 50 to be held against the face and/or forehead comfortably and blocking ambient light. Also as a result, there is an amount of space between the eye position of the user 44 and the lenses 42 which reside in front of the user's eyes sufficient to accommodate the user's eyeglasses, e.g., about one inch or more (in one embodiment, about 25 mm).

As depicted in FIG. 4, one or more switches 56 can be placed on the outside of the handheld device 50 for manipulation by the user 44 when the handheld device 50 is held to the user's face and/or forehead. Such switches 56 may include a rocker switch used to provide control of a parameter which varies through a range, such as channel selection. Other items that could be controlled in this fashion include, but are not limited to, tint, hue or contrast of the image, image brightness, volume control and the like. A slider switch (not shown) can be used, e.g., to select among discrete choices. For example, the slider switch (not shown) may be used to select left, right or no relative frame phasing, to select between stereo and non-stereoscopic views, etc. Other controls and/or indicators can also be used and can be mounted on various surfaces of the handheld device 50 of FIG. 4.

It should be noted that it is not necessary for the user 44 to keep the handheld device 50 within the stadium. In this regard, the audio and video signals 15 and 14 may be transmitted via satellites and/or communication networks to various locations around the world, and the user 44 may select the view he prefers the most from just about any location capable of receiving a video signal 14 and/or audio signal 15.

It should also be noted that the handheld device 50 may be retrieved from the user 44 after the user 44 is finished viewing the event so that the handheld device 50 can be provided to another spectator for another event at the stadium. Each user 44 may be charged a usage fee for the user's use of the handheld device 50. In some embodiments, payment of the fee may be required before the user 44 is provided with the device 50. In other embodiments, the device 50 may receive information, via signals 14 and/or 15 or otherwise, indicating whether the device 50 is authorized to produce sounds and images defined by the signals 14 and 15. In this embodiment, the device 50 is configured to produce such images and sounds only when authorized to do so, and such authorization should only be transmitted to the device 50 once the user 44 of the device 50 has provided payment.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. A method for providing a plurality of user selectable, different viewing perspectives associated with an event to a user of a portable handheld device while attending the event live, the handheld device having a receiver, signal processing logic, a display and a user interface, the method comprising:
   obtaining video signals from a plurality of cameras located at an event, at least two of the cameras being located at different locations around the event and producing video signals defining live video content of the event from different viewing perspectives;
   receiving, through the user interface of the handheld device, an input indicating a desire to view a first video signal from said video signals;
   wirelessly transmitting the first video signal to the receiver of the handheld device;
   displaying, on the display, live video content from the first video signal indicated at the user interface to be desirable to be viewed by a first user;
   wherein the live video content from the first video signal corresponds to one viewing perspective of the event associated with a single one of the cameras located at the event; and
   wherein the transmitting and displaying operations occur continuously a) only in response to input by the first user of the first video signal for viewing while said live event occurs and b) until the first user chooses to input an indication to view another live video content from said video signals.

2. The method of claim 1, further comprising demodulating the first video signal.

3. The method of claim 1, further comprising:
   obtaining audio signals from a plurality of audio sources located at the event, at least two of the audio sources being located at different locations around the event and producing audio signals defining live audio content of the event from different perspectives;
   entering, through the user interface of the handheld device, an input indicating a desire to listen to a first audio signal from said audio signals;

wirelessly transmitting the first audio signal at the receiver of the portable handheld device;

playing the first audio signal; and wherein the audio transmitting and playing operations occur continuously a) only in response to the input indicating the desire by the first user to listen to the first audio signal while said live event occurs and b) until the first user chooses to input an indicating of a desire to listen to another live audio content from the audio signals.

4. The method of claim 1, wherein the displaying further comprises holding the handheld device to the first user's face.

5. The method of claim 1, wherein the displaying further comprises blocking ambient light when the handheld device is held to the first user's face.

6. A portable wireless handheld device to be used at an event by a user while watching the event live, the portable wireless handheld device comprising:

a user interface for entering an input indicating a desire to view first video content from a first source out of a plurality of sources located at the event for viewing by a first user on said display;

a receiver configured to wirelessly receive the first video content transmitted wirelessly to said receiver, the first video content being produced at the first source;

signal processing logic configured for operation by the first user;

a display configured to display the first video content only from the first source of said plurality of sources; and wherein the receiver and display receive and display the first video content continuously a) only in response to the first user's input of the first video signal for viewing while said live event occurs and b) until the first user chooses to input an indication to view another live video content from said video signals.

7. The portable wireless handheld device of claim 6, further comprising logic to analyze information received by said receiver indicating whether the device is authorized to display a select image defined by said select video content.

8. The portable wireless handheld device of claim 6, further comprising a handheld housing containing the receiver, signal processing logic, and display.

9. The portable wireless handheld device of claim 6, wherein said receiver wirelessly receives a plurality of audio signals associated with the event, the user interface configured to allow the first user to select at least one of said audio signals.

10. The portable wireless handheld device of claim 6, wherein said receiver wirelessly receives a plurality of video signals defining said video content from a plurality of cameras at the event that the user is attending live and at another remote event.

11. The portable wireless handheld device of claim 6, wherein said event is an automobile race and said plurality of video signals provide video content from at least one of a live on-track video camera, an on-board race car video camera and a pit crew video camera.

12. The portable wireless handheld device of claim 6, wherein the first video content includes intermittent images of said event.

13. The portable wireless handheld device of claim 6, wherein said display is a liquid crystal display.

14. The portable wireless handheld device of claim 6, wherein said display comprises a plurality of screens.

15. The portable wireless handheld device of claim 6, further comprising a shroud substantially surrounding said display.

16. The portable wireless handheld device of claim 6, wherein a plurality of cameras provide a sideline view of said event and a user view of said event.

17. The portable wireless handheld device of claim 6, wherein said receiver receives a plurality of multiplexed video signals carried over a carrier frequency.

18. The portable wireless handheld device of claim 6, wherein the video content displayed corresponds to a single video camera and wherein the user is able to view video content from the single video camera uninterrupted until the user chooses to select another single video camera.

19. The portable wireless handheld device of claim 6, wherein said receiver is configured to receive wirelessly video content originating at another event remote from the event that the user is attending live.

20. The portable wireless handheld device of claim 6, wherein said event is a game played on a field and one of a plurality of cameras is located on at least one of i) said field and ii) on a helmet of a player.

21. The portable wireless handheld device of claim 6, wherein said event is a game played on a field and said video content received by said receiver includes a first image from a field sideline perspective of said game and a second image from a user perspective of said game, said signal processing logic allowing the user to select one of the first and second images.

22. The portable wireless handheld device of claim 6, wherein said event occurs at a stadium and said handheld device is configured to operate at said stadium.

23. The portable wireless handheld device of claim 6, wherein said video content includes first and second images associated with separate first and second events, said signal processing logic allowing said user to enter an input indicating a desire to view one of the first and second images.

24. The portable wireless handheld device of claim 6, wherein said receiver permits the user to roam away from the event while said display intermittently displays images defined by said video content.

25. The portable wireless handheld device of claim 6, further comprising a housing adapted to be held against a user's face and cover a user's eyes.

* * * * *